United States Patent
Pavlov

(10) Patent No.: US 9,267,492 B2
(45) Date of Patent: Feb. 23, 2016

(54) POWER TRANSFER AND GENERATION USING PRESSURIZED FLUIDS

(71) Applicant: CURIOSITATE, INC., Cambridge, MA (US)

(72) Inventor: Elan Y. Pavlov, Cambridge, MA (US)

(73) Assignee: Curiositate, Inc., Cambridge, MA (US)

( * ) Notice: Subject to any disclaimer, the term of this patent is extended or adjusted under 35 U.S.C. 154(b) by 163 days.

(21) Appl. No.: 14/177,779

(22) Filed: Feb. 11, 2014

(65) Prior Publication Data

US 2014/0246792 A1   Sep. 4, 2014

Related U.S. Application Data

(60) Provisional application No. 61/771,204, filed on Mar. 1, 2013.

(51) Int. Cl.
| | |
|---|---|
| *F03D 9/00* | (2006.01) |
| *B01F 3/04* | (2006.01) |
| *F03D 9/02* | (2006.01) |
| *F03B 13/26* | (2006.01) |

(52) U.S. Cl.
CPC ............ *F03D 9/028* (2013.01); *B01F 3/04106* (2013.01); *F03B 13/264* (2013.01); *F05B 2260/406* (2013.01); *Y02E 10/28* (2013.01); *Y02E 10/725* (2013.01); *Y02E 60/15* (2013.01)

(58) Field of Classification Search
CPC .... B01F 3/04; B01F 3/04099; B01F 3/04106; F03D 9/00; F03D 9/02; F03D 9/028

USPC .......... 60/398, 645; 261/119.1, 121.1; 290/44
See application file for complete search history.

(56) References Cited

U.S. PATENT DOCUMENTS

| | | | | |
|---|---|---|---|---|
| 4,206,608 | A * | 6/1980 | Bell ........................ | F03D 9/007 290/4 R |
| 4,455,834 | A | 6/1984 | Earle | |
| 5,599,172 | A | 2/1997 | McCabe | |
| 7,183,664 | B2 * | 2/2007 | McClintic ............. | F03D 7/0236 290/44 |
| 2006/0248892 | A1 | 11/2006 | Ingersoll | |
| 2008/0047271 | A1 | 2/2008 | Ingersoll | |

FOREIGN PATENT DOCUMENTS

| | | | |
|---|---|---|---|
| JP | 01253572 | A * | 10/1989 |
| WO | 2010125568 | A2 | 11/2010 |

* cited by examiner

*Primary Examiner* — Robert A Hopkins
(74) *Attorney, Agent, or Firm* — Flachsbart & Greenspoon, LLC

(57) ABSTRACT

The invention captures harvestable mechanical energy, e.g., in the form of wind or moving water, and uses it for electrical generation or other work. In various embodiments a turbine is used to pressurize a fluid, and the pressurized fluid is then optionally stored and then used to drive an electric generator. Because the pressurized fluid can be stored in a pressurized state indefinitely, the invention provides a straightforward way to accumulate the mechanical energy until it is needed. Additionally, the invention allows portions of the system, e.g., a pressure vessel or generator, to be located away from the turbine, reducing the costs of deploying and maintaining the system.

32 Claims, 7 Drawing Sheets

POWER TRANSFER AND GENERATION USING PRESSURIZED FLUIDS

RELATED APPLICATIONS

This application claims priority to U.S. Provisional Patent Application No. 61/771,204, filed Mar. 1, 2013, which is incorporated by reference in its entirety.

FIELD OF THE INVENTION

The invention relates to wind turbines, and other sources of harvestable mechanical energy, coupled to devices that pressurize fluids to generate electricity. Because the pressurized fluids can be stored, the electrical generation can be better coordinated with the demand for electricity.

BACKGROUND

Currently wind turbines have gearboxes that are prone to mechanical failure. The metal gears and shafts can be bent or snapped, and the lubricating fluids can ignite because of the intense temperatures produced once the gearbox begins to fail. Maintenance to prevent such failures is a substantial ongoing cost in electrical wind production. Furthermore, the gearboxes are typically located at a substantial height (i.e., the top of the wind tower), which further complicates maintenance activities. Additionally, the extra weight of a gearbox requires the use of reinforced turbine towers, further increasing construction costs, and making offshore installation substantially more costly.

SUMMARY

The invention provides a system for capturing mechanical energy (e.g., wind or tidal forces), using the mechanical energy to pressurize a fluid, and then producing electricity with the pressurized fluid. Because the pressurized fluid is easily stored in a pressure vessel, the systems lend themselves to asynchronous electrical production, that is, the energy of the source can be accumulated and stored until needed. In other words, the electrical production does not have to track the mechanical production, i.e., electricity can be produced when the wind isn't blowing. The invention can use both gasses and liquids to couple the captured mechanical energy to electrical generation, and some systems use both gas (pneumatic) and liquid (hydraulic) pressurization.

In an embodiment, the system comprises a wind turbine, a pump (or other device for pressurizing a fluid), and a generator. As the wind blows, the turbine rotates, causing a fluid to be pressurized. The pressurized fluid can be stored or used immediately to generate electricity. Because it is easy to transport fluids up and down a wind tower, e.g., with pipes or tubing, the generator and/or storage pressure vessel can be located on the ground. Accordingly, the construction costs for the turbine are reduced (lighter-weight tower) and the lifetime maintenance costs are reduced (e.g., crews do not have to climb tower to make repairs).

In another embodiment, the system comprises an electrical generation system including a wind turbine having a rotating shaft, a fluidic pump mechanically coupled to the rotating shaft, a pressure vessel, a fluidicly-powered electric generator, a first valve fluidicly coupled between the fluidic pump and the pressure vessel, and a second valve fluidicly coupled between the pressure vessel and the fluidicly-powered electric generator. The system is designed such that rotational motion from the wind turbine causes the fluidic pump to pressurize a fluid, and the pressurized fluid moves through the pressure vessel and energizes the fluidicly-powered electric generator, thereby generating electricity.

In another embodiment, the system comprises an electrical generation system including a tidal turbine having a rotating shaft, a fluidic pump mechanically coupled to the rotating shaft, a pressure vessel, a fluidicly-powered electric generator, a first valve, actuated at a first fluidic pressure, and being fluidicly coupled between the fluidic pump and the pressure vessel, and a second valve, actuated at a second fluidic pressure, and being fluidicly coupled between the pressure vessel and the fluidicly-powered electric generator. The system is designed such that rotational motion from the tidal turbine causes the fluidic pump to pressurize a fluid, allowing the fluid to move past the first valve and into the pressure vessel, such that accumulated pressure in the pressure vessel allows the fluid to move past the second valve and energize the fluidicly-powered electric generator, thereby creating electricity.

In another embodiment, the system comprises an electrical generation system. The system includes an actuator that receives hydrodynamic force, such as tidal flow, and uses it to pressurize a fluid, a pressure vessel, a fluidicly-powered electric generator, a first valve, actuated at a first fluidic pressure, and being fluidicly coupled between the actuator and the pressure vessel, and a second valve, actuated at a second fluidic pressure, and being fluidicly coupled between the pressure vessel and the fluidicly-powered electric generator. The system is designed such that hydrodynamic forces causes the actuator to pressurize a fluid, allowing the fluid to move past the first valve and into the pressure vessel and the accumulated pressure in the pressure vessel allows the fluid to move past the second valve and energize the fluidicly-powered electric generator, thereby creating electricity.

The invention further includes an electrical generation system including a wind turbine including a rotating shaft, a fluidic pump mechanically coupled to the rotating shaft, a fluidicly-powered electric generator, and a first valve fluidicly-coupled between the fluidic pump and the fluidicly-powered electric generator. The system is designed such that rotational motion from the wind turbine causes the fluidic pump to pressurize a fluid that energizes the fluidicly-powered electric generator, thereby generating electricity.

The invention also includes an electrical generation system including a wind turbine having a rotating shaft and having two sets of at least two blades coupled to the rotating shaft. The system also has a fluidic pump mechanically coupled to the rotating shaft, a pressure vessel, a fluidicly-powered electric generator, a first valve fluidicly coupled between the fluidic pump and the pressure vessel, a second valve fluidicly coupled between the pressure vessel and the fluidicly-powered electric generator, and an elevated structure supporting the wind turbine and the fluidic pump, wherein each set of at least two blades is oriented on opposite sides of the elevated structure during operation. The system is designed such that rotational motion from the wind turbine causes the fluidic pump to pressurize a fluid, and the pressurized fluid moves through the pressure vessel and energizes the fluidicly-powered electric generator, thereby generating electricity.

In another embodiment, the invention is an electrical generation system. The system including a wind turbine including a rotating shaft, a fluidic pump mechanically coupled to the rotating shaft, first and second pressure vessels, a fluidicly-powered electric generator, a first valve fluidicly coupled between the fluidic pump and the first pressure vessel and actuated at a first pressure, a second valve fluidicly coupled between the fluidic pump and the second pressure vessel and actuated at a second pressure, a third valve fluidicly coupled between the first pressure vessel and the fluidicly-powered electric generator, and a fourth valve fluidicly coupled between the second pressure vessel and the fluidicly-powered electric generator. The system is designed such that rotational motion from the wind turbine causes the fluidic pump to pressurize a fluid and the pressurized fluid moves through the first or the second valves to pressurize the first or second pressure vessel, respectively, and pressurized fluid passes through the third or fourth valve to energize the fluidicly-powered electric generator, thereby generating electricity.

The invention also includes a system for transferring torque. The system includes a source of torque coupled to a pump, a coupling in fluid communication with the pump and containing a fluid, an impeller in fluid communication with the coupling, and a receiver of torque coupled to the impeller. The system is designed such that the torque from the source is transferred to the receiver through motion of the fluid against the impeller.

The invention also includes a system for distributing energy from a variable source. The system includes a power source coupled to a pump capable of producing variable pressure in a fluid, a plurality of pressure vessels, and a power receiver capable of converting pressurized fluid into electrical or mechanical work. The system additionally has a plurality of inflow valves, each of the plurality of inflow valves being coupled between the pump and a pressure vessel, and a plurality of outflow valves, each of the plurality of outflow valves being coupled between the pressure vessel and the power receiver. The system is designed such that each of the plurality of inflow valves and each of the plurality of outflow valves can be independently actuated. In this sense, the system of valves and pressure vessels can be used like a gear ratio.

The invention also includes a system configured to rapidly ramp up or ramp down the output electricity from a wind turbine in order to facilitate the power grid's efforts to match supply and demand and maintain stable frequencies, provide direct grid integration for wind turbines, and other short duration energy storage applications. The system includes a fluidic pump, a pressure vessel, and a fluidicly powered generator. The fluidic pump pressurizes the working fluid, thereby transferring energy from the rotating blades to the fluidicly powered generator. The system is configured so the transferred energy can either be partially sent to, or supplemented by energy from, the pressure vessel. In some embodiments, energy is stored in the pressure vessel in the form of compressed air. In some embodiments, the system is configured exclusively to provide short duration energy storage. Conventionally, integration of wind energy into the power grid has been challenging, and has led to additional costs being incurred by independent service operators (ISO). This configuration is tailored to use the energy storage capacities of a wind turbine to provide ISO's with additional services that significantly reduces the burden of wind energy integration, and provides an additional revenue stream for a wind turbine owner.

Other implementations of the invention will be self-evident upon regarding the text, figures, and claims of the application.

DETAILED DESCRIPTION

Figure 1:
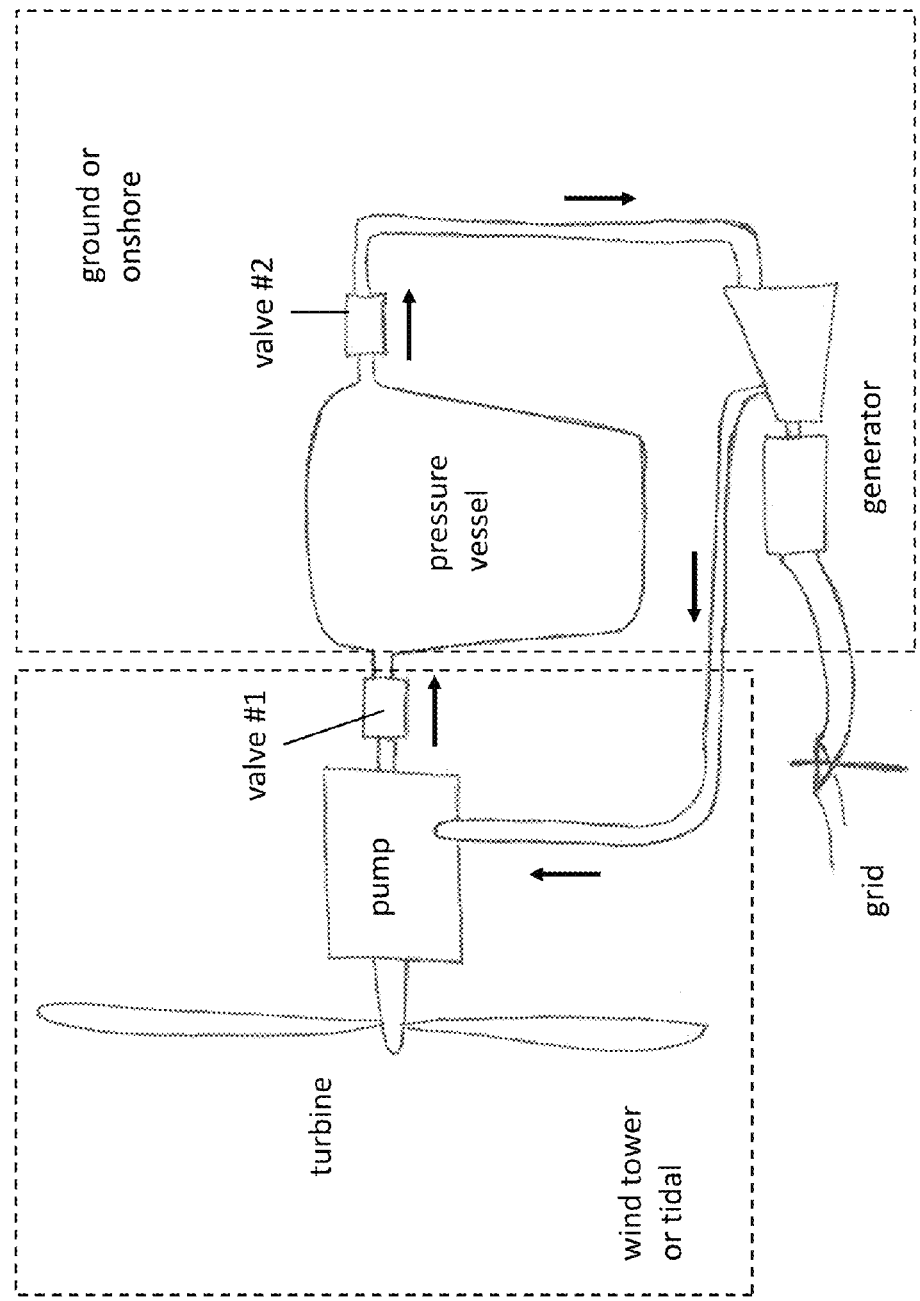
FIG. 1 is an illustration of the components of an embodiment of a system of the invention.

The disclosed invention uses harvestable mechanical energy, e.g., in the form of wind or moving water to pressurize a fluid or fluids to drive an electrical turbine. Because the pressurized fluid can be stored in a pressurized state indefinitely, the invention provides a straightforward way to accumulate mechanical energy until it is needed.

In a general sense, the invention makes use of valves and pressure vessels to achieve mechanical advantage. In state of the art wind turbine systems, a gearbox is used to gain a speed advantage over the rotary shaft that is coupled to the blades. That is, the gearbox is a method of converting torque into speed. The blades of the wind turbine move very slowly (approx. 20 rpm) but the electrical generation is done via a generator which moves very rapidly (above 1000 rpm). Gearboxes transfer the torque of the blade into speed for the generator.

As an alternative method of transferring torque, a valve, e.g., a one way valve, e.g., a check valve is used as a power accumulator. A check valve is a valve which only allows fluid flow in a single direction. However, a check valve has the additional property that the pressure at which fluid begins to flow (or the valve "cracks") can be determined and set. Other types of valves such as electronically-actuated valves can be used as long as the cracking pressure can be controlled either actively or passively. The behavior of a check valve can also be mimicked using electronically-actuated valves and one or more pressure sensors.

The disclosed invention allows a slowly rotating, but high torque, shaft to be coupled to a simple pump or other means of inducing a pressure change in a fluid. There are many mechanisms for translating rotational energy of the blades into pressure. Non-pump examples include worm gears as well as cranks. The pressurized fluid then passes through a check valve, or other flow-controlling device, and pressurizes a storage vessel. Once the pressure has accumulated sufficiently in the storage vessel, the pressure can be released to energize an electric-generation device, e.g., a turbine. The pressure control valve downstream of the pressure storage vessel can be another check valve, or a control valve. The valve can also be remotely actuated, using, e.g., pneumatic, hydraulic, or electronic control. The downstream pressure control valve can also be electronically actuated based upon a reading from a pressure sensor.

Overall, the system provides for accumulation of pressure, without backflow that would be caused by e.g., a decrease in wind. In some instances the valve controlling flow into the pressure storage vessel will have a low cracking pressure, and the valve controlling flow out of the pressure storage vessel will have a high cracking pressure. (This means that this check valve will hold the fluid in its pressurized state because the pressurized fluid can neither proceed due to the high cracking pressure needed to proceed, nor reverse due to the one way nature of the valve used to pressurize the fluid).

In some instances, a system will comprise a plurality of valves and storage vessels allowing the pump to work most efficiently based upon the incident wind speed. That is, at low wind speed, the pump may produce lower pressure fluid and only fill a pressure vessel connected to a check valve having a low cracking pressure. At higher wind speeds, the pump may produce higher pressure fluid and fill a pressure vessel connected to the check valve having a low cracking pressure in addition to pressure vessels connected to check valves having higher cracking pressures. Once one or more of the pressure vessels reach a pressure high enough to crack the downstream valves, the fluid will be released to energize the generator.

Among other advantages, this system allows much of the heavy machinery associated with power generation to be located away from the source of the mechanical energy. For example, an electrical generator need not be located atop a wind tower, or submerged under water. In one embodiment, a system includes only blades coupled to a shaft, a simple pump coupled to the shaft, and a valve, e.g., a check valve, atop a wind tower. The actual power generation can be done at the bottom of the tower. This arrangement decreases construction and maintenance costs, and also allows efficiencies of scale in certain equipment (e.g., generator), because the pressurized fluids can be aggregated at a central location and used to create electricity on an as-needed basis. Such an arrangement also reduces the cost of the tower which can be constructed of substantially less expensive materials. While it may be necessary to perform additional work to return a fluid to the source of the mechanical energy, e.g., a booster pump to return a fluid to the top of a wind tower, portions of this extra work will be recovered, for example, the potential energy added to the fluid to move it to the top of the wind tower.

A further extension is to integrate storage with generation. Since the energy is accumulated in the storage vessel, it is trivial to delay deployment of the pressurized fluid until it is needed. That is, generation can be delayed until peak usage times, when there is demand for electricity, or when the cost per kW exceeds a certain threshold. For example, the pressure can be allowed to build up in the pressure vessel and then released into a generator or turbine using, e.g., an electronically controlled valve. Such systems will also allow more efficient use of wind resources during the night, because all of the energy stored (as pressurized fluid) during the night can be recovered during the day, compared to battery banks that lose some of their charge while they are waiting to be used.

While delayed generation may require a larger vessel, existing containers of a variety of shapes and sizes can be inexpensively obtained and used for this purpose. For example used pressure tank trailers could be connected in parallel and configured to act as a storage vessel. Alternatively, geologic formations, such as mines, can be sealed and used for large-scale operations.

Generation and storage of pressurized fluids also allows alternative modes for transmitting the stored energy to populated areas. For example, it is possible to deploy pressurized fluid systems far away from electric transmission lines as long as suitable transportation is available. In an embodiment, turbines could be deployed near an abandoned rail spur. The pressure storage vessels could be tank cars that would receive the pressurized fluids and then the tank cars could be moved to a power generation facility that was closer to a populated area. Alternatively, a pressurized pipeline can be installed between the source of the energy (e.g., a turbine) and the point of use (e.g., a town).

Systems of the invention additionally lend themselves to hybrid energy production. For example, the heat generated during the pressurization process can be collected with heat exchangers and used to provide heating or hot water. For example, the heat produced by a turbine located on agricultural land may be used to provide heat for a barn or anaerobic digester. Additionally, pressurized air systems can use a portion of the pressurized air to fuel the pressurization stages of a natural gas turbine (a.k.a. "peaker") used to provide electrical energy. It is estimated that approximately two-thirds of the energy produced in a gas turbine is used to pressurize the air for combustion, thus a pressurized air system could be used to fill a storage vessel and then released at peak times to feed the turbine.

Using a pressurized gas wind turbine as described above to pressurize air for a gas turbine would yield a reliable and extremely cheap source of energy which is mostly renewable (i.e. ⅔ of the power is renewable) and which is reliable in the sense that, if wind fails, more gas can compensate. Furthermore, a combined pressurized gas system coupled with a gas turbine can leverage the availability of the mechanical energy to provide electricity at peak times at the lowest cost. For example, a wind turbine can be used during the night to pressurize air that is used during the day with a gas turbine (when demand is higher). This novel hybrid technique (which can be combined with other pressurized cycles which are not gas) reduces the cost of the wind component of the energy even further since no generation of electricity must actually takes place.

Another advantage of this system is that it smoothes out variance in the wind speed since it can simply pressurize a vessel quicker or slower depending upon the wind. In conventional turbines, a complex system of rotating hubs and gears is used to maximize the energy production for a given wind speed. However, with the disclosed invention, the turbine can simply be allowed to run at the speed that the wind pushes it. If the wind is slow, less pressurized fluid will be produced, however, no electricity will be generated until enough pressurized fluid has been built up in the storage vessel. If the wind is fast, more pressurized fluid will be produced and electricity can optionally be produced. Depending upon the pump mechanism used, it may not be necessary to change the pitch of the blades, which also reduces the weight and complexity of the system. In other embodiments, a series of check valves and storage vessels can be used to step up the pressure in stages. In some embodiments, a plurality of pressure vessels and valves can be used to take advantage of variable wind production, as discussed previously.

The methods described can be used with a variety of fluids, e.g., gases, and liquids. In particular, systems for using pressurized gasses (e.g., pneumatics) to perform work are well known and commercially available. Once chief advantage of a pneumatic system is that ambient air can be used as the pressurizeable gas, thereby diminishing the need for a system to return the fluid to the mechanical energy source, e.g., the turbine at the top of a wind tower. (Of course, using ambient air may require additional systems such as filters and dehumidifiers to maintain optimum performance in downstream system.) Hydraulic systems of the invention can use any suitable pressurizeable fluid, for example, water, hydraulic fluid, or oils. Equipment for pressurizing, handling, and storing pressurized liquids are known and commercially-available.

Some systems may employ both pressurized gas and pressurized liquids. Because gas and liquids can be easily separated, a system can be designed whereby it is possible to flush gas out of a liquid system on a regular basis. This would allow a system to generate both pressurized liquids and pressurized gasses. Such a system may, for example, pressurize air during the night for pneumatic storage and/or use with a gas turbine (discussed above), and then pressurize hydraulic fluid during the day to increase the efficiency of the energy transfer between the turbine and the generator. An additional advantage is that nighttime air is both drier and more dense, thereby reducing the requirement for conditioning. It is also contemplated that the heat generated during pressurization of gasses can be used to provide power and/or heat temperature sensitive components.

An embodiment of a system of the invention is shown in FIG. 1. The system shown in FIG. 1 harvests mechanical energy, e.g., from the wind or water, couples the mechanical energy to a device for increasing the pressure on a fluid, i.e., a pump, and the resultant pressurized fluid is accumulated in a pressure reservoir, whereby it can optionally be stored for later use, and the pressurized fluid can be used to energize a generator.

The system depicted in FIG. 1 is generally scalable. That is, a system of FIG. 1 can be small, such as suitable for a private residence or business, or for remote generation such as a worksite, camp, farm, etc. Alternatively, a system of FIG. 1 can be used for high-capacity electrical generation by scaling all of the components and/or using parallel systems. Thus, systems of the invention can vary in total generation capacity from less than 50 kW to greater than 2 MW. For example, systems of the invention can be used to produce greater than 100 kW of electricity, e.g., greater than 500 kW of electricity, e.g., greater than 500 kW of electricity, e.g., greater than 800 kW of electricity, e.g., greater than 1 MW of electricity, e.g., greater than 2 MW of electricity, e.g., greater than 5 MW of electricity.

The generator depicted in FIG. 1 can be any electricity-generating device that can receive a pressurized (or moving) fluid and covert the mechanical energy into electrical energy. The generator will typically comprise an alternator, however dynamo or rotary converters can also be used. Typically, the output will be alternating current with a voltage and phase to match the local electrical grid, however, other configurations, such as direct current production are also feasible. In some embodiments, the electrical output may be fed into a bank of batteries for reserve storage when energy resources are in surplus, but there is not demand for the electricity.

As shown in FIG. 1, a basic turbine system incorporates a turbine to capture mechanical energy and couple it to a device for increasing the pressure on a fluid. The captured mechanical energy may be wind, wherein the turbine comprises blades or vanes that rotate with the incident wind. Alternatively, the energy may be water, such as a flowing river, tides, or waves, wherein the turbine comprises a blades, vanes, fins, propellers, or floating weights. The turbine generally will couple the captured mechanical energy via a rotating shaft to a device for increasing the pressure on a fluid, however reciprocating motion (back and forth) can also be coupled to a device to increase a pressure on a fluid. In some embodiments, the fluid is pressurized with a pump, such as a rotary vane compressor, a scroll compressor, a piston compressor, a rotary vane pump, a scroll pump, a piston pump, a gear pump, or a worm gear. In some instances, the pump is configured to pressurize both gasses and liquids to increase flexibility and efficiency, as discussed below.

In order to control the flow of the pressurized fluid and to increase flexibility for storage, a system will typically have an inflow valve and an outflow valve associated with the pressure vessel (valve #1 and valve #2, respectively). In some embodiments, the valves are manually actuated. In other embodiments, the valves are electronically activated. In still other embodiments, the valves are self-actuating, e.g., metering or check valves.

Figure 2:
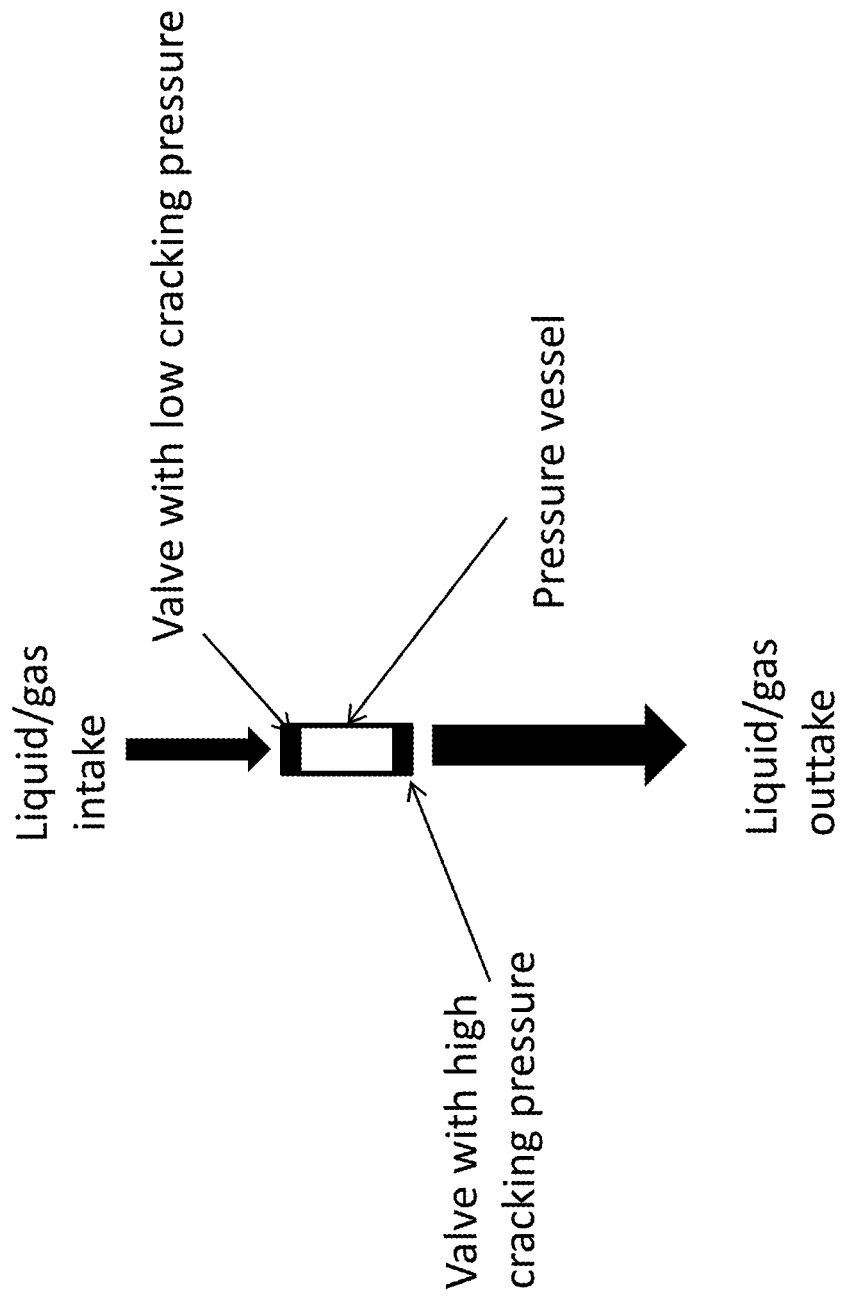
FIG. 2 depicts a pressure aggregation device for use in a system of the invention.

An advantage to using check valves is that the cracking pressure for the check valve can be set so that the pressure vessel can be used as a power accumulator. This concept is depicted in FIG. 2, where a pressure chamber with a low-pressure intake valve and a high-pressure outtake valve is used as a power accumulator. As the pump (or other device) pressurizes the fluid, the fluid cannot move into the pressure vessel until it has reached a given pressure, whereby the fluid can pass through the first valve (with a low cracking pressure) and enter the pressure vessel. If the outflow valve is set to a yet higher cracking pressure, the pressure vessel will be filled with higher pressure fluid up to the point that the outflow valve cracks and releases the pressure. The accumulated pressurized fluid can be used to do work, e.g., generate electricity. Furthermore, if the outflow valve is set for a pressure in the optimal range for the generator, the generator will only be energized when it will efficiently generate electricity. Alternatively, the pressure vessel outflow valve may also be independently actuated, or the outflow valve may comprise two valves, first a check valve and then a valve that is independently actuated. Such a design will allow pressure to be stored and then released when needed. For example, the turbine may pressurize a fluid during the night and fill the pressure vessel. During the day, when demand is higher, the outflow valve can be actuated to energize the generator, thereby producing electricity to meet the demand. The independently actuated valve may be remotely controlled, or it may be controlled by a sensor that measures pressure within the pressure vessel and/or electrical demand.

Figure 3:
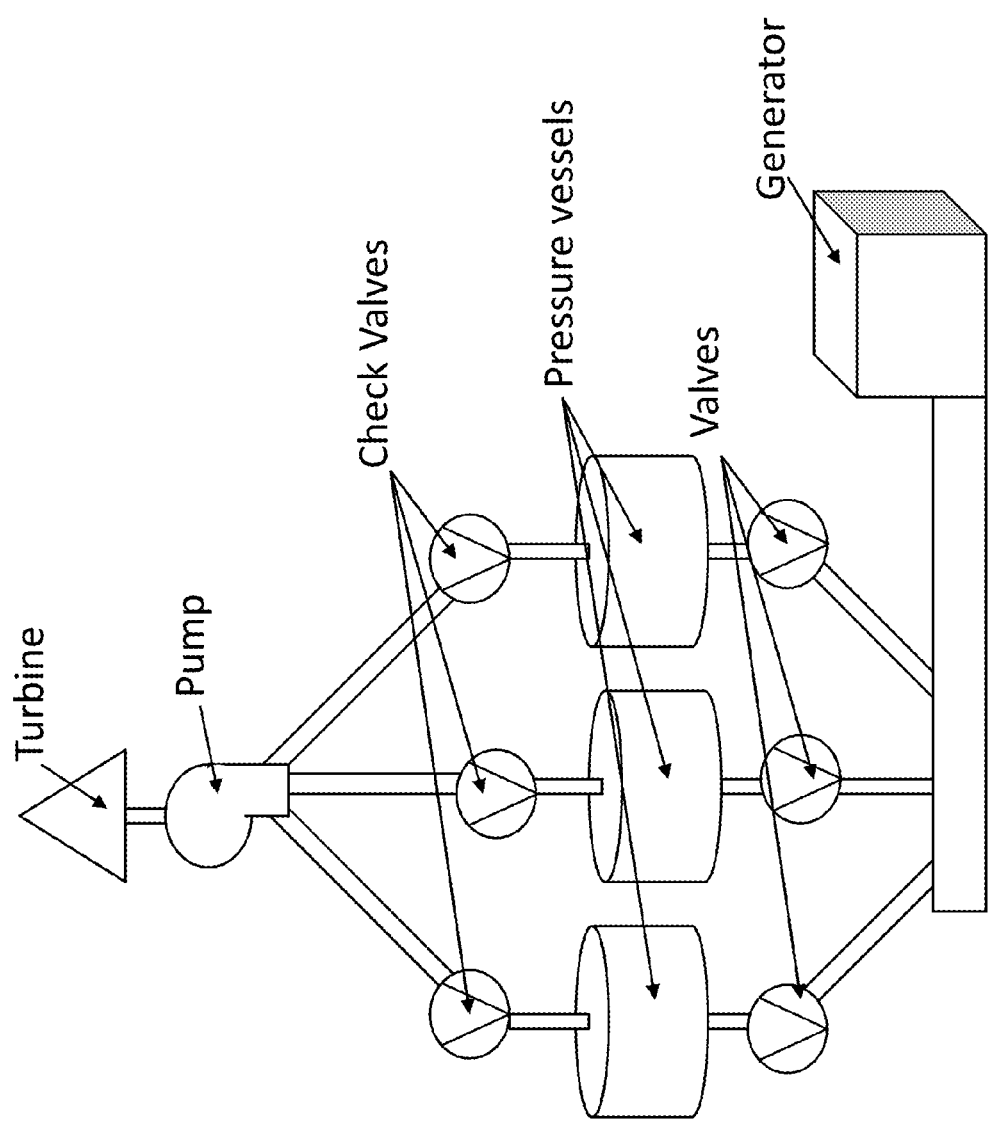
FIG. 3 depicts an alternative embodiment of a wind turbine including a plurality of pressure vessels fillable through a plurality of check valves having different cracking pressures.

The concepts disclosed in FIG. 2 can be extrapolated to a system of pressure vessels, each having an inflow valve set to a different pressure, as shown in FIG. 3. Such a system allows the output of the turbine, which may be variable due to intermittent wind, to be smoothed to allow more efficient energy production. For example, as depicted in FIG. 3, a system may comprise a turbine coupled to a pump. The pump pressurizes a fluid that is in communication with three different valves. At low wind, the pump will only be able to produce enough pressure to crack the valve with the lowest cracking pressure, thus filling a pressure vessel with lower pressure fluid. With greater wind, the pump will be able to produce higher pressures and thus crack the valves on the lowest check valve as well as additional valves, thereby resulting in multiple vessels being filled with higher pressure fluids. Each of the vessels has an outflow valve, which can be independently actuated or it can be a check valve or a combination. Because the outflow valves either have a higher cracking pressure or an actuatable valve, the combination of pressure vessels can be used to accumulate usable power regardless of the wind conditions. Such a system not only allows for more predictable energy generation, but it increases the efficiency of the electrical generation because the generator is only operated under favorable conditions. The system described in FIG. 3 can be extended to more than three pressure vessels, and may additionally may use of pressure sensors to monitor the pressure from the pump and inside the pressure vessels.

Figure 4:
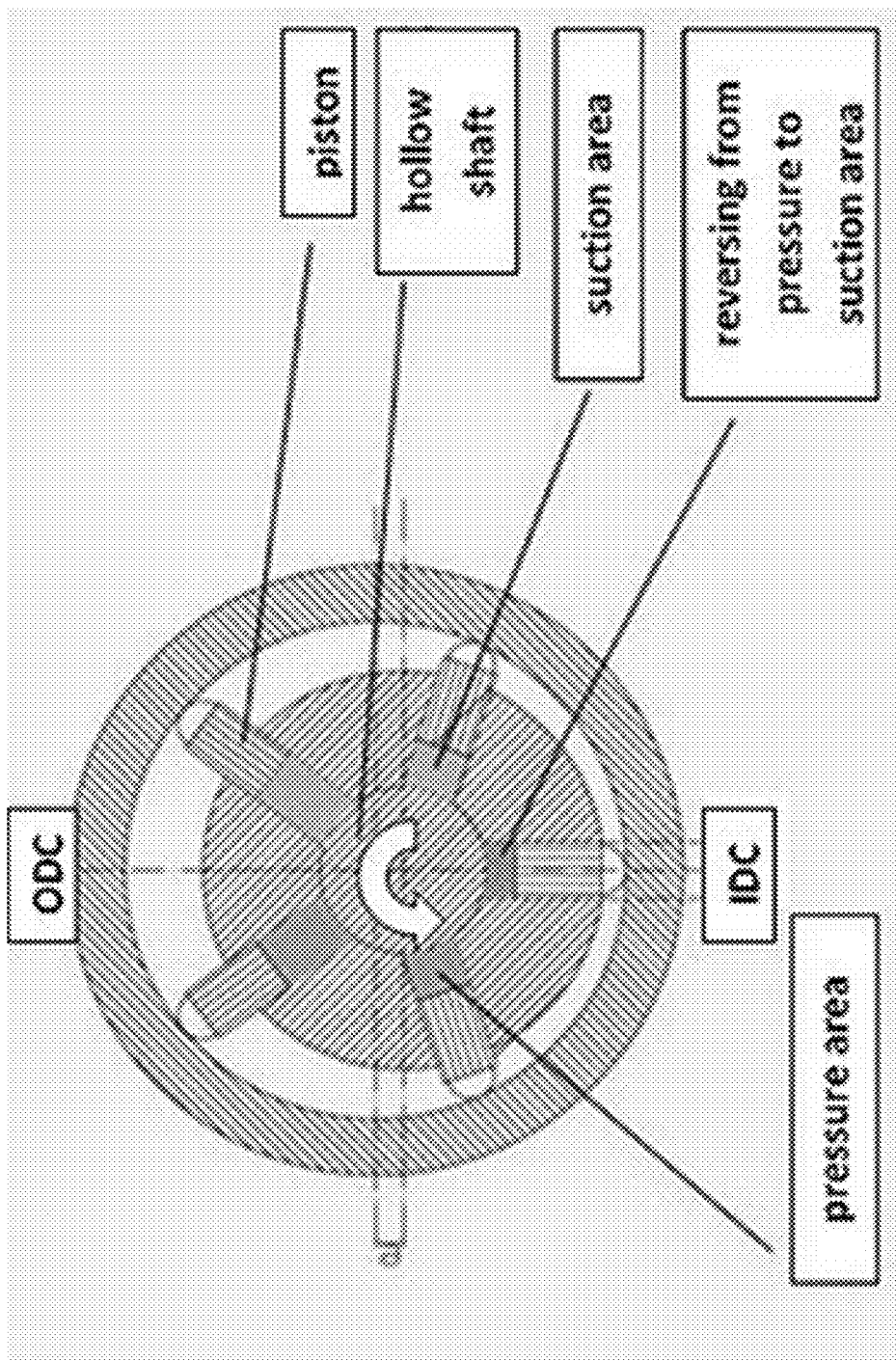
FIG. 4 is an exemplary radial pump that can be used to pressurize fluids with mechanical energy harvested from a wind turbine or another source.

A wide variety of devices may be used to pressurize a fluid for use in a system of the invention. For example scroll compressors or rotary compressors. In some embodiments, the system may use a radial pump (FIG. 4) which provides the advantages of pumping (pressurization) at a variety of incident wind speeds, as well as the ability to handle a range of pressure loads. Furthermore, in some instances, it may be possible to do away with the inflow valve by using a radial pump, which will pressurize a fluid against a backing pressure until an outflow valve after the pressure reservoir is released. In some simplified embodiments, the system need not include a pressure vessel, per se, as the conduit, pipe, hose, etc., between the pump and the generator will act as the pressure vessel, allowing accumulation of pressurized fluid.

Figure 5:
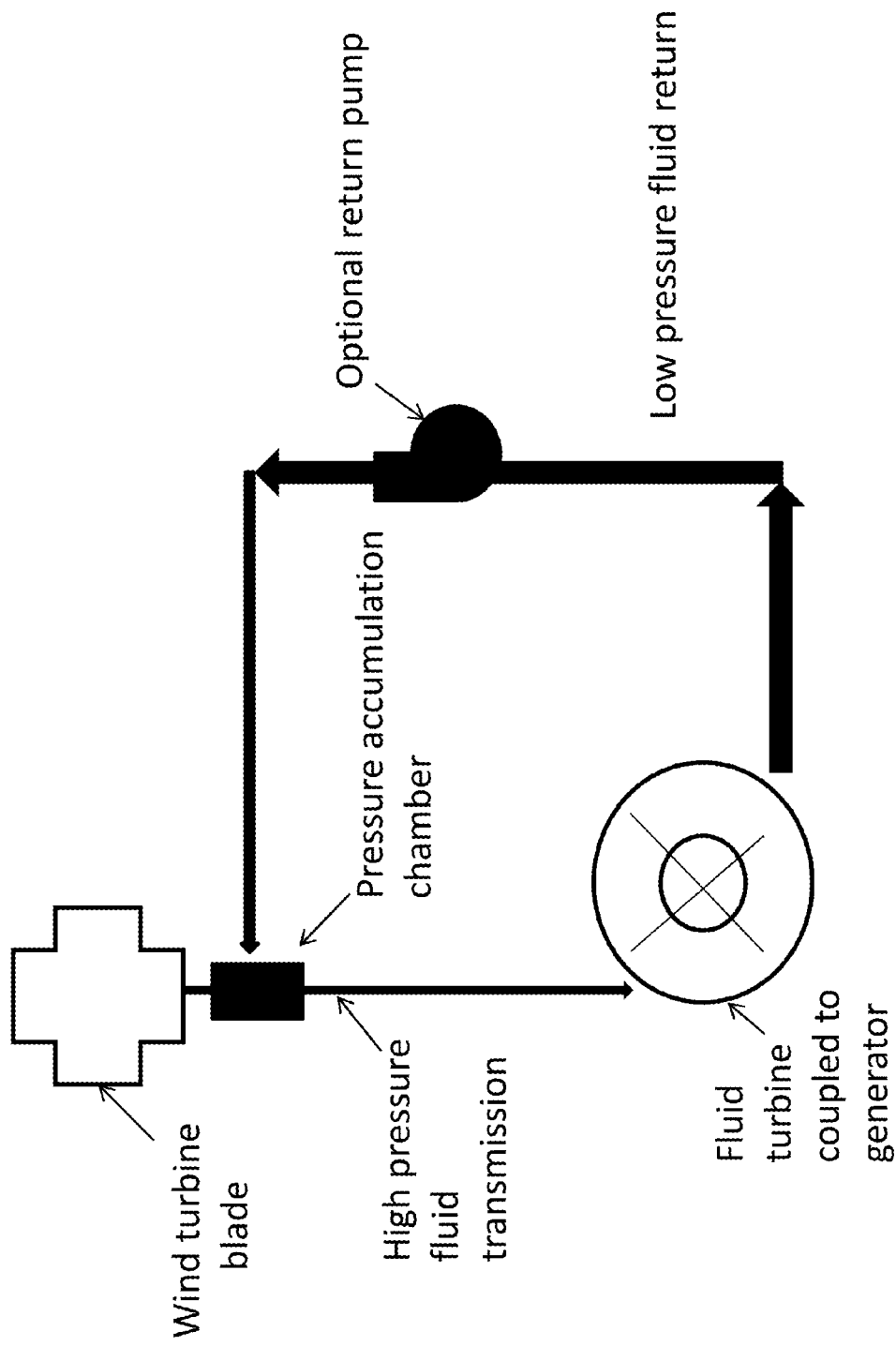
FIG. 5 is schematic of a system of the invention including a return fluid path (closed loop system)

In some embodiments, it will be advantageous to have the pressurized fluid complete a full loop including the pump and the generator, i.e., as shown in FIG. 5. For example, in systems that use dry argon or hydraulic fluid, it is desirable to recirculate the pressurization fluid so that it does not have to be replaced. In such systems, the fluid will be pressurized as discussed above, optionally stored, and then used to produce electricity or do other work. After the work has been expended, the fluid will be returned to the pump, for example, by a return pump. In some embodiments, a return pump will not be needed because the pump connected to the turbine will also pull on the return loop as it pressurizes the fluid. It should be noted that the work required to return a fluid to the top of a nacelle is partially offset by the gravitational pull on the pressurized fluid leaving the nacelle on the other side of the loop.

In some embodiments, compressed gas can be used directly for other purposes. For example, compressed air can be used to aerate a pond used for aquaculture. Aeration of aquaculture ponds is a well-known problem in which air is added to a pond to either increase oxygen levels in the pond or to move water mass within the pond. There are various types of aeration mechanisms. For example, the diffusion aeration machine sold by Jones Fish Hatcheries Inc. which can be seen at http://wwwjonesfish.com/catalog/5. In these diffusion machines air is pushed to the bottom of the pond and then rises to the top pushing the water along with it. We can utilize the mechanism described above. Instead of utilizing the compressed fluid to generate electricity, we can utilize the compressed air to aerate a pond. Combining the wind compression with aeration is a novel application of wind technology.

As denoted by the dashed boxes in FIG. 1, an advantage to systems of the invention is the ability to locate the turbine and the pump separately from the pressure vessel and generator. The boxes in FIG. 1 are not obligatory, however, as portions of the system, e.g., valve #1, can be located at the turbine, or elsewhere, depending upon need. In the instance of an offshore wind turbine or a tide- or wave-harvesting system, the pressure vessel and generation can be located onshore, greatly reducing the installation and maintenance costs for those components. Pressurized fluid can be simply piped onshore where it can be used for electrical generation. Furthermore, the pressure vessel and the generator need not be co-located, as the pressure vessel may be, e.g., an underwater storage vessel, and the generator located onshore.

In the case of wind generation, the design results in a much smaller and lighter-weight nacelle. Principally, the space and weight savings are the result of no longer requiring a gearbox in the nacelle. Removing the gearbox from the nacelle several advantages: First, the construction and installation costs are reduced because it is not necessary to build a tower strong enough to hold the turbine and the gearbox. Additionally, it is not necessary to bring in a heavy duty crane to place the gearbox atop the tower. Second, there are fewer parts that need to be serviced or maintained in the nacelle, reducing the time and expense of dealing with key power-generating components. Third, the chance of fire in the nacelle is greatly reduced because there are not as many high speed components. Fourth, pumps for the invention are typically much less expensive than gearboxes and related control componentry.

Figure 7:
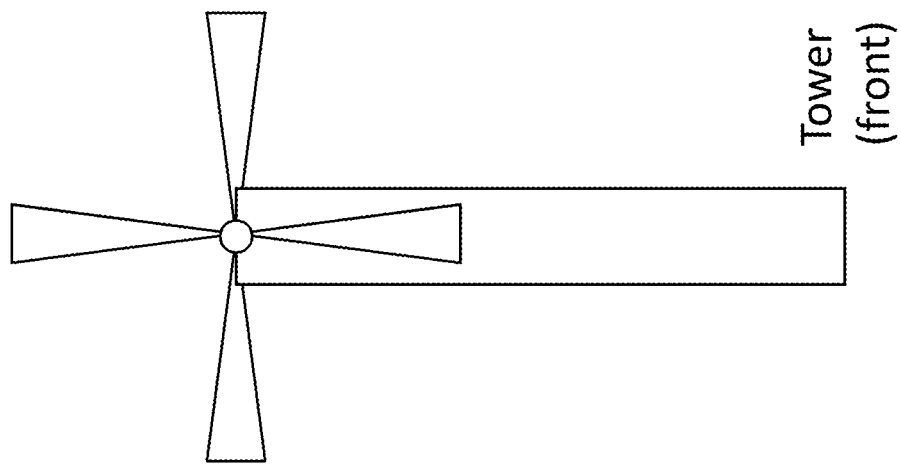
FIG. 7 is a side view of a wind turbine having counterbalanced blades on either side of the tower.
Figure 6:
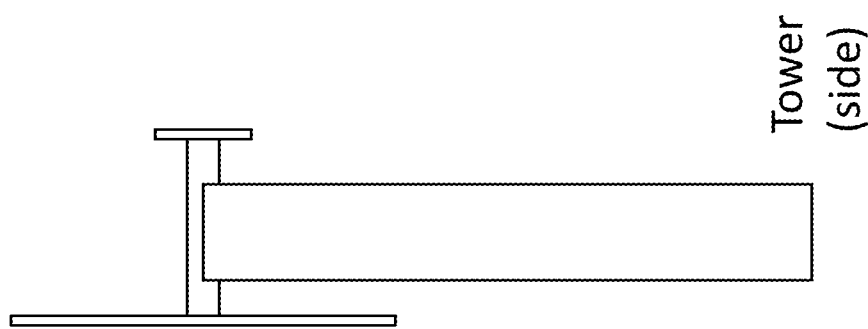
FIG. 6 is a side view of a wind turbine having counterbalanced blades on either side of the tower.

One problem that can arise when the gearbox is removed from the nacelle is that the heavy turbine blades are no longer counterbalanced by the gearbox. In most wind turbines the blades (about a third of the top weight) are counterbalanced by the gearbox in the nacelle. While the counterbalance issue can be solved with reinforced bearings for the turbine shaft or counterweights, it is also possible to split the blades into multiple parts, as shown in FIGS. 6 and 7. That is, some of the blades can be in front of the tower while others are behind. While only two blades are shown in the front and back of the turbine assembly in FIGS. 6 and 7, it is understood that a turbine may comprise additional blades in a similar configuration, e.g., three, four, five, six, seven, eight, or more blades. In some configurations, one set of blades may be counterweighted by a combination of blades and counterweights on the opposite side of the main (wind-catching) blades.

Figure 8:
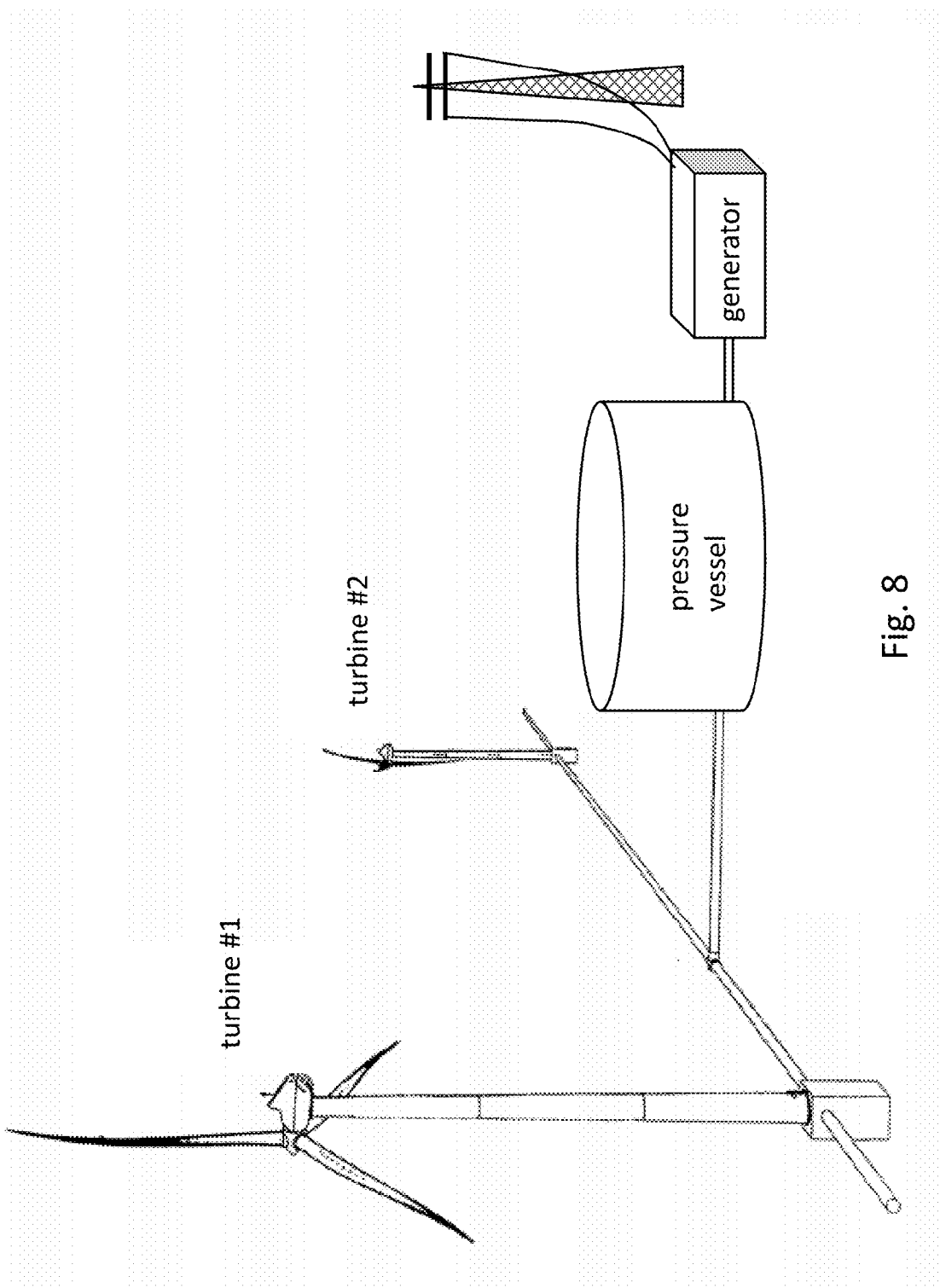
FIG. 8 depicts a system including a plurality of wind turbines whose pressurized fluid production is collected in a pressure vessel for on-demand electrical generation.

In addition to scaling the systems to increase overall generation capacity, it is also possible to combine certain components of the system to increase overall efficiency and/or reduce capital costs. For example, as shown in FIG. 8, multiple turbines, each comprising a pump, can be coupled together and fed into a larger pressure vessel, capable of receiving pressurized fluids from multiple sources. Additionally, the larger pressure vessel (or a number of pressure vessels) can be fed into a single generator, thereby taking advantage of certain efficiencies of scale in power generation.

INCORPORATION BY REFERENCE

References and citations to other documents, such as patents, patent applications, patent publications, journals, books, papers, and web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:
1. An electrical generation system comprising:
a wind turbine comprising a rotating shaft;
a fluidic pump mechanically coupled to the rotating shaft;
a pressure vessel;
a fluidicly-powered electric generator;
a first valve fluidicly coupled between the fluidic pump and the pressure vessel;
a second valve fluidicly coupled between the pressure vessel and the fluidicly-powered electric generator; and
a return flow path from the fluidicly-powered electric generator to the fluidic pump;
wherein rotational motion from the wind turbine causes the fluidic pump to pressurize a fluid, and the pressurized fluid moves through the pressure vessel and energizes the fluidicly-powered electric generator, thereby generating electricity.

2. The system of claim 1, wherein the rotating shaft is oriented horizontally and the turbine comprises at least two blades.

3. The system of claim 1, wherein the rotating shaft is oriented vertically and the turbine comprises at least two vanes.

4. The system of claim 1, wherein the first valve is actuated at a first fluidic pressure.

5. The system of claim 1, wherein the second valve is actuated at a second fluidic pressure.

6. The system of claim 1, wherein the fluidic pump is a pneumatic pump.

7. The system of claim 6, wherein the pneumatic pump is selected from a rotary vane compressor, a scroll compressor, and a piston compressor.

8. The system of claim 1, wherein the fluid is air and wherein a portion of the air leaving the pressure vessel is coupled to a turbine.

9. The system of claim 1, wherein the fluidic pump is a hydraulic pump.

10. The system of claim 9, wherein the hydraulic pump is selected from a rotary vane pump, a scroll pump, a piston pump, a gear pump, and a worm gear.

11. The system of claim 1, wherein the fluid comprises an oil.

12. The system of claim 1 wherein the fluidic pump is both a pneumatic pump and a hydraulic pump.

13. The system of claim 1, wherein the pressure vessel is selected from a metal pressure vessel, an expandable pressure vessel, a subterranean cavern, a geologic formation, and a highly insulated pressure vessel.

14. The system of claim 1, wherein the first and second valves are independently selected from a ball valve, a needle valve, a block valve, a check valve, a metering valve, and a solenoid valve.

15. The system of claim 14, wherein the first valve or the second valve is additionally electronically actuated.

16. The system of claim 15, further comprising a controller operably connected to the second valve and capable of actuating the second valve when electric energy production is desired.

17. The system of claim 1, wherein the pressurized fluid from the fluidic pump can be configured to bypass the pressure vessel to directly power the fluidicly-powered generator.

18. The system of claim 1 wherein an electronic timing of the valves determines the fraction of energy stored to/released from the pressure vessel to the fluidicly-powered generator.

19. The system of claim 1, further comprising a third valve fluidicly coupled between the first valve and the pressure vessel.

20. The system of claim 1, wherein the return flow path additionally comprises a second fluidic pump.

21. An electrical generation system comprising:
a wind turbine comprising a rotating shaft;
a fluidic pump mechanically coupled to the rotating shaft;
first and second pressure vessels;
a fluidicly-powered electric generator;
a first valve fluidicly coupled between the fluidic pump and the first pressure vessel and actuated at a first pressure;
a second valve fluidicly coupled between the fluidic pump and the second pressure vessel and actuated at a second pressure;
a third valve fluidicly coupled between the first pressure vessel and the fluidicly-powered electric generator; and
a fourth valve fluidicly coupled between the second pressure vessel and the fluidicly-powered electric generator;
wherein rotational motion from the wind turbine causes the fluidic pump to pressurize a fluid, and the pressurized fluid moves through the first or the second valves to pressurize the first or second pressure vessel, respectively and pressurized fluid passes through the third or fourth valve to energize the fluidicly-powered electric generator, thereby generating electricity.

22. The system of claim 21, wherein the second pressure is greater than the first pressure.

23. The system of claim 22, further comprising a pressure sensor.

24. The system of claim 23, wherein the first and second valves are actuated based upon a valve of a pressure sensed by the pressure sensor.

25. The system of claim 24 wherein the electronic timing of the valves determines the fraction of energy stored to/released from the pressure vessel to the fluidicly-powered generator.

26. A system for distributing energy from a variable source comprising:
a power source coupled to a pump capable of producing variable pressure in a fluid;
a plurality of pressure vessels;
a power receiver capable of converting pressurized fluid into electrical or mechanical work;
a plurality of inflow valves, each of the plurality of inflow valves being coupled between the pump and a pressure vessel; and
a plurality of outflow valves, each of the plurality of outflow valves being coupled between the pressure vessel and the power receiver,
wherein each of the plurality of inflow valves and each of the plurality of outflow valves can be independently actuated.

27. The system of claim 26, wherein each of the plurality of inflow valves is a check valve.

28. A system in which a wind turbine is configured to provide rapid ramping of electric power generation, wherein:
the wind turbine is configured with a fluidic pump to store/release energy in a pressure vessel, wherein the pressure vessel contains a gas and in which the change in temperature of the compressed gas is in excess of 100 Celsius;
electricity is generated from a fluidicly-powered generator coupled to the fluidic pump and/or the pressure vessel;
electricity generation is configured to match dispatch signals from the grid.

29. The system of claim 28, wherein rapid ramping of electric power generation is used for short duration energy storage applications, including wind turbine grid integration, frequency regulation, area regulation, voltage support, providing transmission support, or promoting electric power quality.

30. The system of claim 28, wherein the energy storage capacity of the pressure vessel is used for a duration of over 3 minutes.

31. The system of claim 28, wherein the wind turbine uses the energy storage to guarantee constant power output to the power grid over a period of ten minutes.

32. The system of claim 28, wherein the ramping time is less than 5 minutes.

* * * * *